US012590625B2

(12) United States Patent
Truax et al.

(10) Patent No.: US 12,590,625 B2
(45) Date of Patent: Mar. 31, 2026

(54) LINEAR ACTUATORS WITH ANTI-BACKDRIVE MECHANISMS

(71) Applicant: Brunswick Corporation, Mettawa, IL (US)

(72) Inventors: Perin E. Truax, Hastings, MI (US); Craig A. Ulman, Greenville, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/530,504

(22) Filed: Dec. 6, 2023

(65) Prior Publication Data

US 2025/0189021 A1     Jun. 12, 2025

(51) Int. Cl.
*F16H 25/24* (2006.01)
*H02K 7/06* (2006.01)

(52) U.S. Cl.
CPC ........... *F16H 25/2454* (2013.01); *H02K 7/06* (2013.01)

(58) Field of Classification Search
CPC ......... F16H 25/2454; F16H 2025/2463; F16H 25/2003; F16H 25/2021
See application file for complete search history.

(56) References Cited

U.S. PATENT DOCUMENTS

| | | | |
|---|---|---|---|
| 2,052,846 A | 9/1936 | Anton | |
| 2,823,325 A | 2/1958 | Alfred | |
| 3,813,065 A | 5/1974 | Hallesy | |

| | | | |
|---|---|---|---|
| 8,794,085 B2 * | 8/2014 | Balducci | F16H 25/2021 |
| | | | 74/89.42 |
| 10,231,662 B1 | 3/2019 | Berme et al. | |
| 2007/0057119 A1 | 3/2007 | McAuley | |
| 2014/0260733 A1 | 9/2014 | Goncalves | |
| 2017/0056579 A1 * | 3/2017 | Müri | A61M 5/14546 |
| 2018/0013332 A1 | 1/2018 | Al-Mahshi et al. | |

FOREIGN PATENT DOCUMENTS

| | | | |
|---|---|---|---|
| EP | 2657129 A2 | 10/2013 | |
| EP | 3640134 A1 | 4/2020 | |
| EP | 3640134 B1 * | 3/2021 | F16H 25/2204 |
| FR | 2952414 A1 | 5/2011 | |
| GB | 1413682 A | 11/1975 | |

OTHER PUBLICATIONS

Deuel et al., "Electric Linear Actuator With Position Sensing," U.S. Appl. No. 17/716,542, filed Apr. 8, 2022 (drawings, specification, and claims only).
Search Report in corresponding European Application No. 24213788.3, dated Apr. 30, 2025, 10 pages.

* cited by examiner

*Primary Examiner* — Randell J Krug
(74) *Attorney, Agent, or Firm* — Andrus Intellectual Property Law, LLP

(57)     ABSTRACT

An electric linear actuator comprises a housing extending along an axis, a spindle in the housing and extending along the axis, a motor coupled to and configured to rotate the spindle, and a rod coaxially coupled to the spindle and axially movable with respect to the housing in response to rotation of the spindle, the rod comprising a groove. A resilient member is configured to be received in the groove to prevent back-drive of the motor when the rod is subject to a load.

20 Claims, 11 Drawing Sheets

L

218

280

216

281

220

LINEAR ACTUATORS WITH ANTI-BACKDRIVE MECHANISMS

FIELD

The present disclosure relates to linear actuators, and specifically to linear actuators for use on marine vessels.

BACKGROUND

U.S. patent application Ser. No. 17/716,542, filed Apr. 8, 2022, which is hereby incorporated by reference in its entirety, discloses an electric linear actuator having a housing extending along a longitudinal axis. A spindle is provided in the housing and extends along the longitudinal axis. A rod is coaxially coupled to the spindle and extends from a proximal end located in the housing to a distal end located outside the housing. The rod is movable along the longitudinal axis in response to rotation of the spindle. A circuit board is located in the housing adjacent the proximal end of the rod. The circuit board includes a linear inductive sensor having a linear axis oriented parallel to the longitudinal axis. The linear inductive sensor senses an actual position of the proximal end of the rod.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, an electric linear actuator comprises a housing extending along an axis, a spindle in the housing and extending along the axis, a motor coupled to and configured to rotate the spindle, and a rod coaxially coupled to the spindle and axially movable with respect to the housing in response to rotation of the spindle, the rod comprising a groove. A resilient member is configured to be received in the groove to prevent back-drive of the motor when the rod is subject to a load.

According to some aspects, the spindle moves the rod in a first axial direction such that the rod radially outwardly flexes the resilient member.

According to some aspects, the groove is an annular groove.

According to some aspects, the resilient member is axially fixed relative to the housing.

According to some aspects, the spindle axially moves the rod in a first axial direction toward a first rod position and the rod radially outwardly flexes the resilient member. The resilient member is received in the groove when the rod is in the first rod position.

According to some aspects, the first rod position is a fully retracted position of the rod.

According to some aspects, as the spindle moves the rod from the first rod position in a second axial direction toward a second rod position, the rod radially outwardly flexes the resilient member out of the groove.

According to some aspects, the rod further comprises a lip that radially outwardly flexes the resilient member as the spindle moves the rod in a first axial direction toward a first rod position in which the resilient member is received in the groove.

According to some aspects, the lip has a radially outwardly sloping surface that wedges the resilient member radially outwardly as the spindle moves the rod in the first axial direction.

According to some aspects, the lip flexes the resilient member radially outwardly as the spindle moves the rod from the first rod position in a second axial direction opposite the first axial direction.

According to some aspects, the rod has a proximal rod end adjacent to the motor and an opposite, distal rod end and the groove is at the proximal rod end.

According to one example of the present disclosure, a linear actuator comprises a housing extending along an axis, a rod axially movable so as to extend and retract with respect to the housing, the rod comprising a groove, and a resilient member configured to be received in the groove to prevent inadvertent extension of the rod from the housing when the rod is subject to an external load.

According to some aspects, a spindle is coaxially coupled to the rod and an electric motor configured to rotate the spindle to axially move the rod.

According to some aspects, the rod has a proximal rod end adjacent to the motor and an opposite, distal rod end and the groove is at the proximal rod end.

According to some aspects, the rod moves in a first axial direction such that the rod radially outwardly flexes the resilient member.

According to some aspects, the groove is an annular groove.

According to some aspects, the resilient member is axially fixed relative to the housing.

According to some aspects, the resilient member is received in the groove when the rod is in a first rod position and as the rod is moved from the first rod position in a second axial direction toward a second rod position, the rod radially outwardly flexes the resilient member out of the groove.

According to some aspects, the rod further comprises a lip that radially outwardly flexes the resilient member as the rod moves in a first axial direction toward a first rod position in which the resilient member is received in the groove.

According to some aspects, the lip has a radially outwardly sloping surface that wedges the resilient member radially outwardly as the rod moves in the first axial direction.

According to some aspects, the lip flexes the resilient member radially outwardly out of the groove as the rod moves from the first rod position in a second axial direction opposite the first axial direction.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
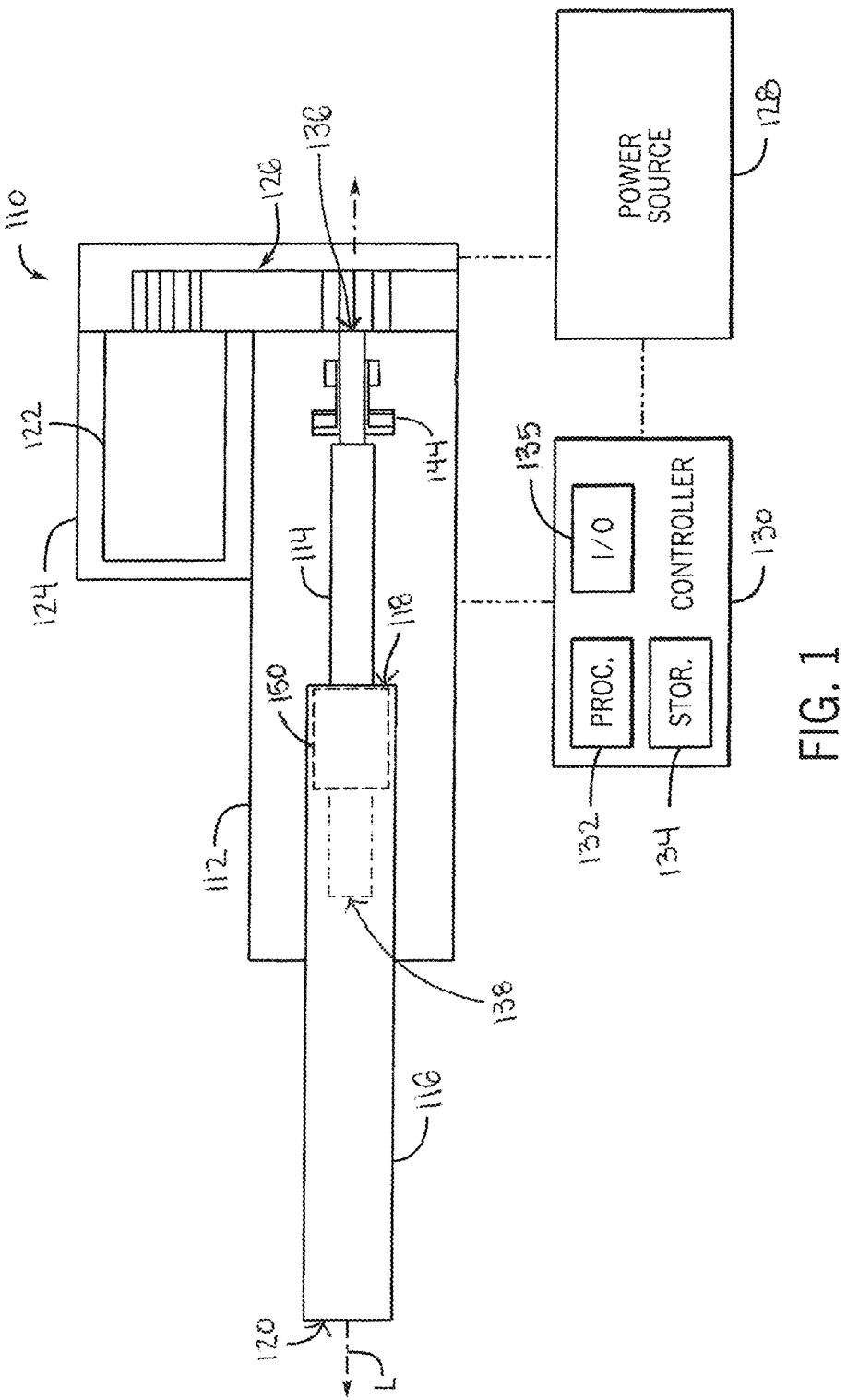
FIG. 1 is a schematic diagram of an example linear actuator according to the present disclosure, in which a motor is geared to a spindle of the actuator.

FIG. 1 is a schematic of an example electric linear actuator 110 according to the present disclosure. The electric linear actuator 110 has a housing 112 which extends along a longitudinal axis L. A spindle 114 is provided in the housing 112 and extends along the longitudinal axis L from a proximal spindle end 136 to a distal spindle end 138. A rod 116 is coaxially coupled to the spindle 114 by way of a spindle nut 150 (e.g., a ball nut, lead nut, acme nut, etc.). The rod 116 extends from a proximal rod end 118 located in the housing 112 to a distal rod end 120 located outside the housing 112. The rod 116 is movable along the longitudinal axis L in response to rotation of the spindle 114, due to the coupling between the rod 116 and the spindle 114 provided by the spindle nut 150.

A motor 122 is configured to rotate the spindle 114. The motor 122 is located in a motor housing 124 adjacent the housing 112. The output shaft of the motor 122 is coupled to the input shaft of the spindle 114 by way of a gear train 126. The motor 122 is provided with power from a power source 128, such as a battery. A controller 130 is configured to control the motor 122, such as by controlling the power provided to the motor 122 from the power source 128. In one example, the controller 130 controls the power to the motor 122 using pulse-width modulation. Note that although the controller 130 and power source 128 are shown as being connected to the housing 112 of the electric linear actuator 110, they are in fact connected to the electrical components inside the housings 112 and 124, and not every signal or power connection is shown herein. Optionally, to increase the efficiency of the electric linear actuator 110 when the rod 116 is pushing against or pulling on a load, a thrust bearing 144 is provided, which decreases the friction that the motor 122 must overcome to rotate the spindle 114 and thereby extend or retract the rod 116 against a load.

The controller 130 includes a processing system 132, a storage system 134 accessible by the processing system 132, and an input/output (I/O) interface 135, which relays information to and from the processing system 132. The processing system 132 can comprise a microprocessor, including a control unit and a processing unit, and other circuitry, such as semiconductor hardware logic, that retrieves and executes software from the storage system 134. The storage system 134 can comprise any storage media readable by the processing system 132 and capable of storing software. The storage system 134 can include volatile and non-volatile, removable and non-removable media implemented in any method or technology for storage of information, such as computer-readable instructions, data structures, software modules, or other data. The processing system 132 loads and executes software from the storage system 134, such as software programmed with a rod positioning algorithm, which directs the processing system 132 to operate to move the rod 116 to a setpoint position. For example, the controller 130 can be programmed to activate the motor 122 with a given voltage and/or current for a given time in order to move the rod 116 from a present position to a setpoint position according to the rod positioning algorithm.

Figure 2:
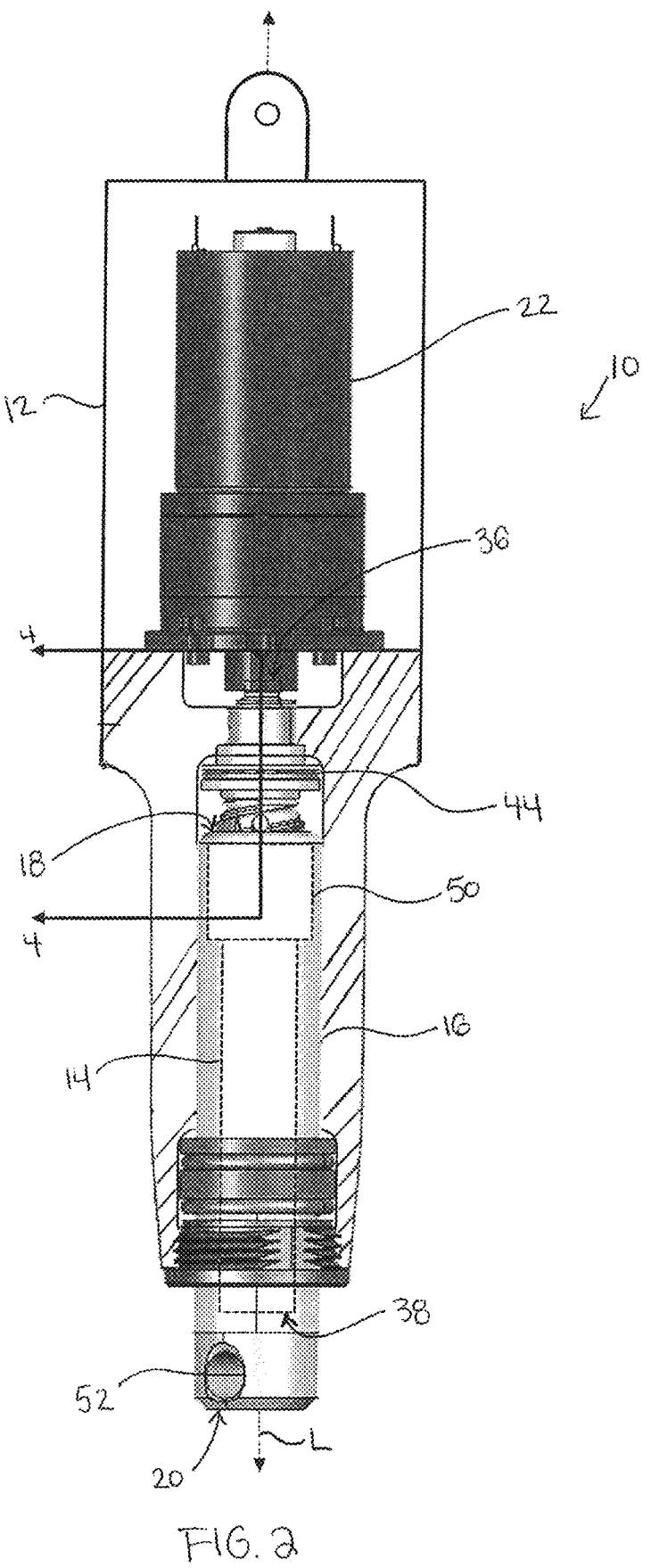
FIG. 2 is a side view of an example linear actuator according to the present disclosure, in which a housing is depicted as transparent and a motor directly drives a spindle of the actuator.

FIG. 2 illustrates another example electric linear actuator 10 according to the present disclosure in which the motor 22 is in line with the longitudinal axis L along which the rod 16 travels. The electric linear actuator 10 includes a housing 12 extending along the longitudinal axis L. A spindle 14 is provided in the housing 12 and extends along the longitudinal axis L from a proximal spindle end 36 to a distal spindle end 38. The spindle 14 shown here is a ball screw, but it could instead be a lead screw, a planetary roller screw, or an acme screw. The motor 22 is coupled to the proximal spindle end 36 of the spindle 14 and is configured to rotate the spindle 14. Such coupling could be made by way of a gear train or a direct-drive coupling. The motor 22 is a reversible motor that can rotate the spindle 14 in two opposite directions. A rod 16 is coaxially coupled to the spindle 14 by way of a spindle nut 50 (e.g., a ball nut in FIG. 2, but spindle nut 50 could instead be a lead nut, acme nut, etc.), and movable with respect to the housing 12 along the longitudinal axis L in response to rotation of the spindle 14. The rod 16 has a proximal rod end 18 and a distal rod end 20. Although not shown herein, the electric linear actuator 10 can be coupled to a controller and power source, which function as described hereinabove with respect to FIG. 1. Optionally, to increase the efficiency of the electric linear actuator 10 when the rod 16 is pushing against or pulling on a load, a thrust bearing 44 is provided, which decreases the friction that the motor 22 must overcome to rotate the spindle 14 and thereby extend or retract the rod 16 against a load.

Figure 3:
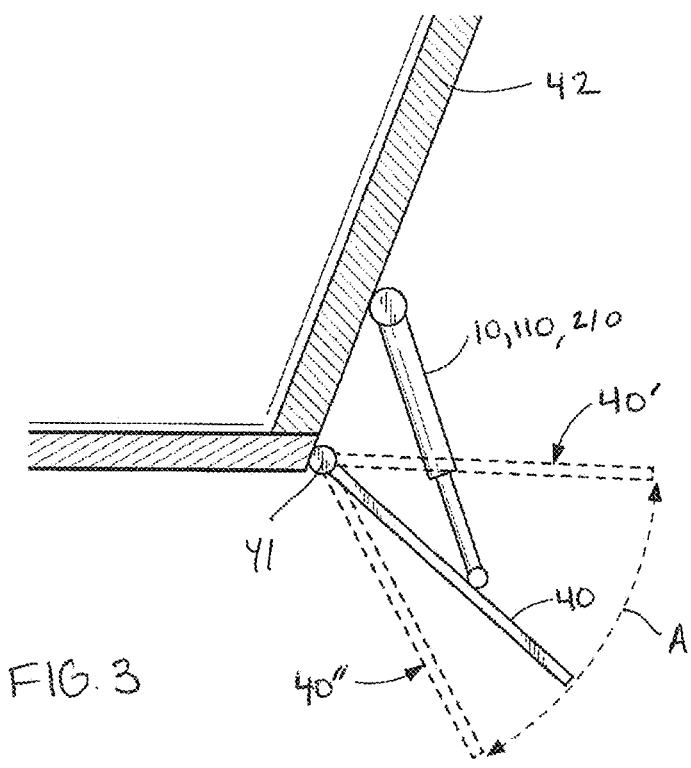
FIG. 3 is a partial cross-sectional view of a boat with a trim tab coupled to a transom by way of an example linear actuator of the present disclosure.

The example electric linear actuators 10, 110 depicted in FIGS. 1-2 and the example linear actuator 210 depicted in FIG. 4 (described in greater detail herein below) can be utilized to pivot a trim tab 40 with respect to a hull or transom 42 of a boat. Specifically, the linear actuator 10, 110, 210 generally has a top first end configured to be coupled to the transom 42 of the boat (a portion of which is schematically depicted in FIG. 3) and an opposite bottom second end configured to be coupled to the trim tab 40. The trim tab 40 is further pivotally coupled to the transom 42 via a hinge 41. In operation, the linear actuator 10, 110, 210 actuates to pivot the trim tab 40 relative to the transom 42 into the water stream created as the boat moves through water to vary the hydrodynamic forces acting on the boat. The operator of the boat may desire to vary the hydrodynamic forces to change steering/turning conditions of the boat and/or generate a desired wake behind the boat.

The electric linear actuator 10, 110, 210 (and thus the position of the trim tab 40) is controlled by the controller 130 in response to inputs to a user input device, which may be a button, switch, key, or touch-sensitive display screen with a virtual key. A user may input a "trim up" command via the user input device, in response to which the controller 130 provides power to the electric linear actuator 10, 110, or 210 to retract the rod 16, 116, 216 into the housing 12, 112, 212 by rotating the spindle 14, 114, 214 in a first direction (e.g., clockwise). The trim tab 40 can be trimmed up to the maximum trimmed-up position shown at 40' in FIG. 3. The user may input a "trim down" command via the user input device, in response to which the controller 130 provides power to the actuator 10, 110, or 210 to extend the rod 16, 116, or 216 from the housing 12, 112, or 212 by rotating the spindle 14, 114, or 214 in an opposite, second direction (e.g., counterclockwise). The trim tab 40 can be trimmed down to the maximum trimmed-down position shown at 40". The distal end of the trim tab 40 thus moves along the arc A as the rod 16, 116, or 216 is extended from or retracted into the housing 12, 112, 212. Note that the example of clockwise rotation of the spindle for trimming up and counterclockwise rotation of the spindle for trimming down are exemplary only; depending on the design of the spindle and spindle nut, the opposite could be true.

Note that one or more linear actuators 10, 110, 210 can couple the trim tab 40 to the boat, and further note that while the linear actuators 10, 110, 210 described herein are described as being electric linear actuators, it is possible that in other examples the linear actuators are other types, such as hydraulic linear actuators or pneumatic linear actuators. The other types of linear actuators can include one or more features and/or components described with reference to the linear actuators 10, 110, 210 described herein. Further note that while the example linear actuators 10, 110, 210 are described herein with reference to the transom 42 and the trim tab 40, the linear actuators 10, 110, 210 of the present disclosure can be utilized with other components of the boat, such as hatch lifts, seating tables, side panels of the boat, an outboard motor, a jack plate, windows, windshield vents, and the like, and component of other vehicles.

Figure 4:
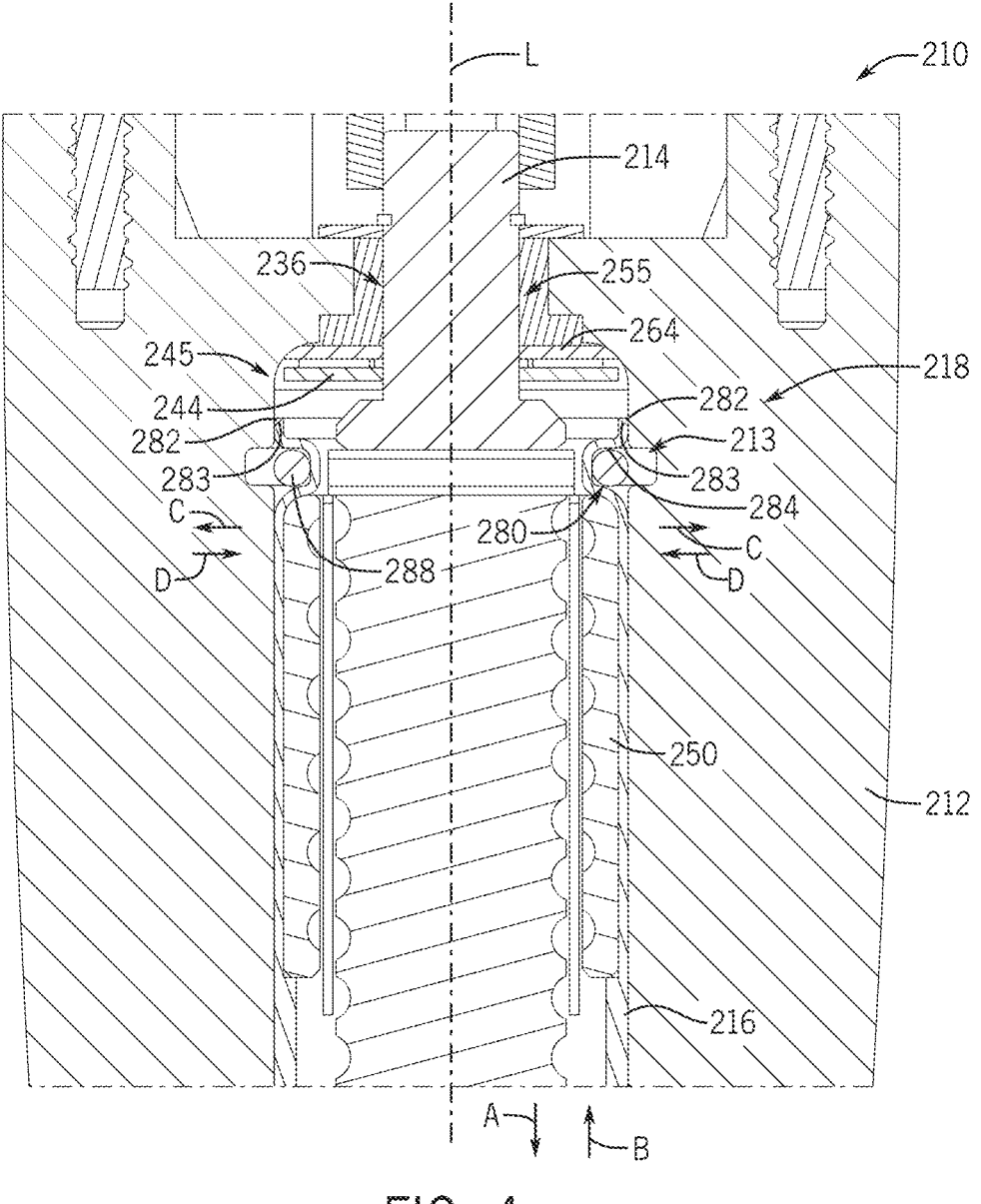
FIG. 4 is a partial cross-sectional view of an example linear actuator according to present disclosure.

Referring now to FIG. 4, a partial view of another example linear actuator 210 is depicted. The linear actuator 210 can include any of the features and/or components of the linear actuators 10, 110 described with reference to FIGS. 1-2. Also note that the linear actuators 10, 110 described above with reference to FIGS. 1-2 can include any of the features and/or components of the linear actuator 210 described with reference to FIG. 4.

The linear actuator 210 includes a housing 212 extending along the longitudinal axis L. A spindle 214 is provided in the housing 212 and extends along the longitudinal axis L from a proximal spindle end 236 to a distal spindle end (not depicted). The motor (not depicted) is coupled to the proximal spindle end 236 of the spindle 214 and is configured to rotate the spindle 214. A rod 216 has a proximal rod end 218 and a distal rod end (not depicted), and the rod 216 is coaxially coupled to the spindle 214 and movable with respect to the housing 212 along the longitudinal axis L in response to rotation of the spindle 214. Optionally, to increase the efficiency of the electric linear actuator 210 when the rod 216 is pushing against or pulling on a load, a thrust bearing 244 is provided, which decreases the friction that the motor must overcome to rotate the spindle 214 and thereby extend or retract the rod 216 against a load. Note that the thrust bearing 244 is provided coaxially on the spindle 214, and in certain examples, provided on a lesser-diameter portion 255 of the spindle 214. The thrust bearing 244 is part of a thrust bearing assembly 245 which can further comprise one or more thrust washers 264.

The present inventors recognized that the rod of actuators that are provided with a thrust bearing to increase efficiency may inadvertently extend out from the housing while the actuator is in certain states (e.g., an unpowered state) because the thrust bearing decreases the friction between the parts so much that even a small load (e.g., the weight of the trim tab 40) can pull the rod out of the housing. Such inadvertent extension of the rod may cause 'back-drive' of the motor. Back-drive of the motor occurs when a load (e.g., weight of the trim tab) acts on the motor of the linear actuator via the spindle and the rod (e.g., the trim tab 'pulls' on the rod when the boat is unpowered, such as when trailered or docked). Through research and experimentation, the present inventors developed the linear actuators of the present disclosure that advantageously prevent or reduce inadvertent extension of the rod from the housing or retraction of the rod into the housing and/or back-drive of the motor. The present inventors further developed the linear actuators of the present disclosure to be simpler and lower cost alternatives to known conventional devices which are designed to prevent back-drive (e.g., linear actuators with spring-loaded electromagnetic brakes or wrap-spring brakes). In addition, the linear actuators of the present disclosure advantageously permit full travel of the rod with no loss of efficiency, no objectionable noise, and/or a small number of components.

The linear actuator 210 further includes a spindle nut 250 (note that the example linear actuators 10, 110 each include a similar spindle nut 50, 150) that is received on the spindle 214 and movable with respect to the housing 212 along the longitudinal axis L in response to rotation of the spindle 214. In certain examples, the spindle nut 250 is configured to be coupled to the second component (e.g., trim tab 40) by way of the rod 216, a clevis (not depicted; see example clevis 52 in FIG. 2), and/or a mounting bracket (not shown). The spindle nut 250 is positioned between upper and lower shoulders formed within the rod 216 and thus the rod 216 is configured to extend and retract from the housing 212 as the spindle nut 250 travels along the spindle 214. Such extension and retraction of the spindle 214 moves the second component (e.g., trim tab 40) with respect to the first component (e.g., the transom 42 of the boat), or vice versa. To prevent or reduce inadvertent extension or retraction of the rod 216 and/or back-drive of the motor (see for example motor 122 in FIG. 1), the rod 216 comprises a groove 280 at the proximal rod end 218 in which a resilient member 288 (described in greater detail hereinbelow) is selectively received to prevent inadvertent axial movement of the rod 216 relative to the housing 212 in either a first axial direction (arrow B) or a second axial direction (arrow A). The resilient member 288 in the groove 280 prevents back-drive of the motor when the rod 216 is subject to a load and the motor is not powered on. For example, when the resilient member 288 is in the groove 280, the resilient member 288 prevents inadvertent axial movement of the rod 216 (e.g., the resilient member 288 locks the rod 216 in place) out of the housing 212 in the second axial direction (see arrow A) and thereby prevents back-drive of the motor.

Figure 5:
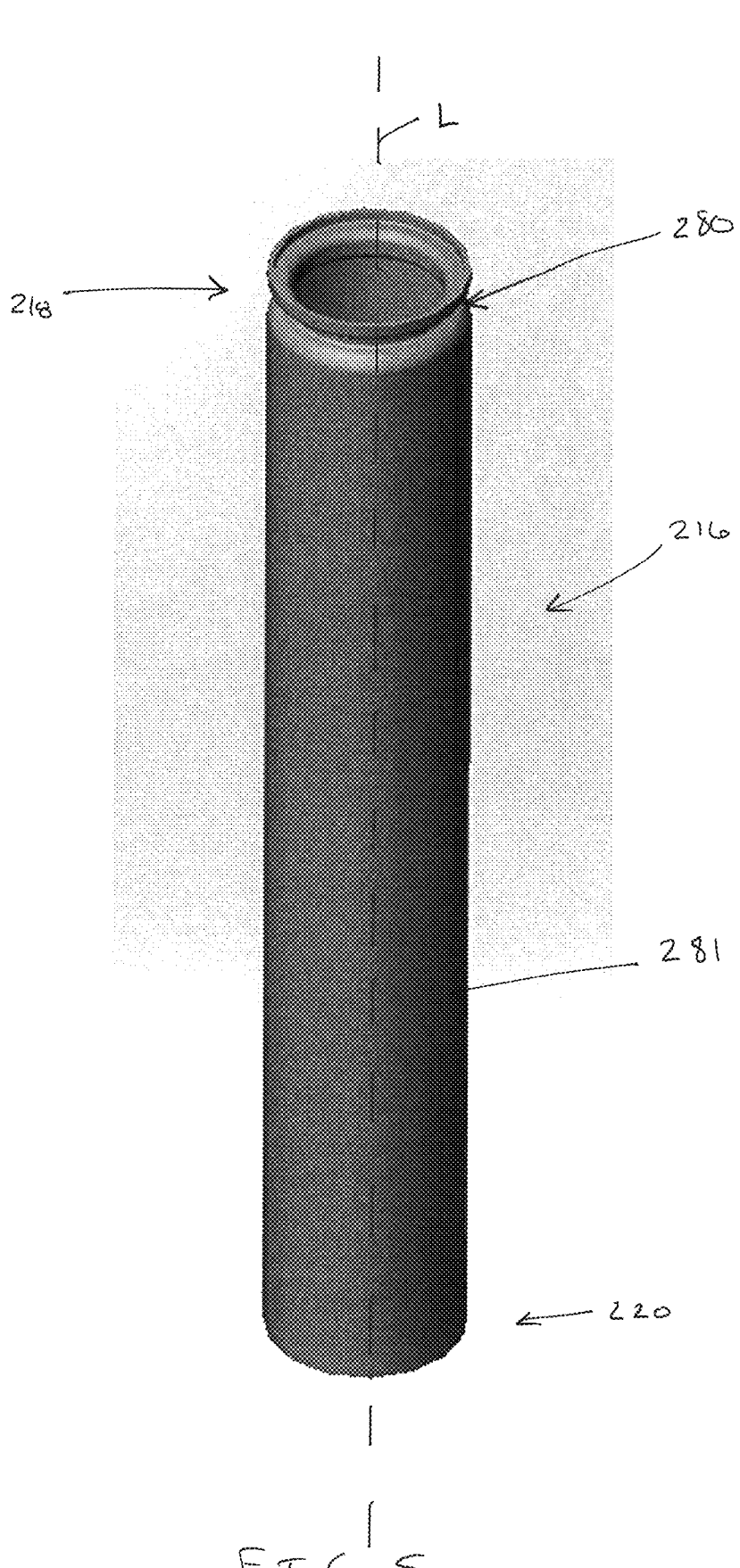
FIG. 5 is a perspective view of an example rod according to the present disclosure.

Turning now to FIG. 5, the rod 216 is depicted in greater detail. The rod 216 extends along a longitudinal axis L, and the rod 216 has a sidewall 281. The sidewall 281 generally forms a cylindrical shape with a radially inwardly pinched section where the groove 280 is located. The groove 280 is at the proximal rod end 218 which is opposite the distal rod end 220. The shape of the groove 280 can vary, and in the example depicted in FIGS. 4 and 5 the groove is an annular groove 280. Note that the groove 280 can extend continuously around the sidewall 281 or can comprise a plurality of groove segments that are each spaced apart from one other around the circumference of the sidewall 281.

Figure 6:
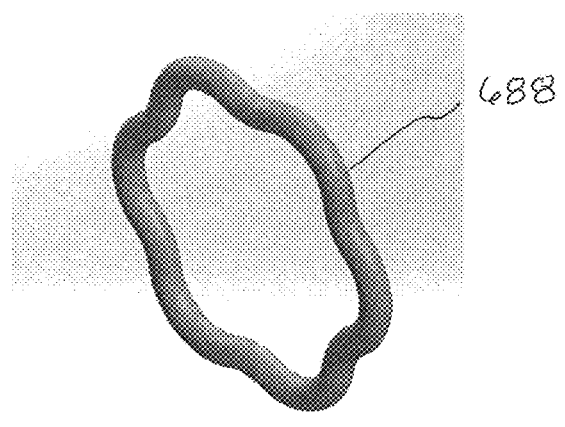
FIGS. 6-9 are perspective views of example resilient members according to the present disclosure.
Figure 7:
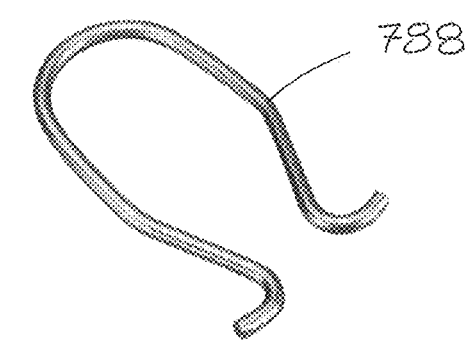
Figure 8:
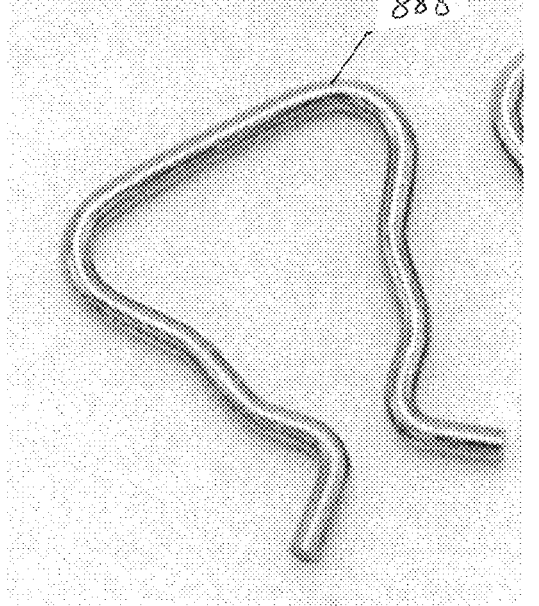
Figure 9:
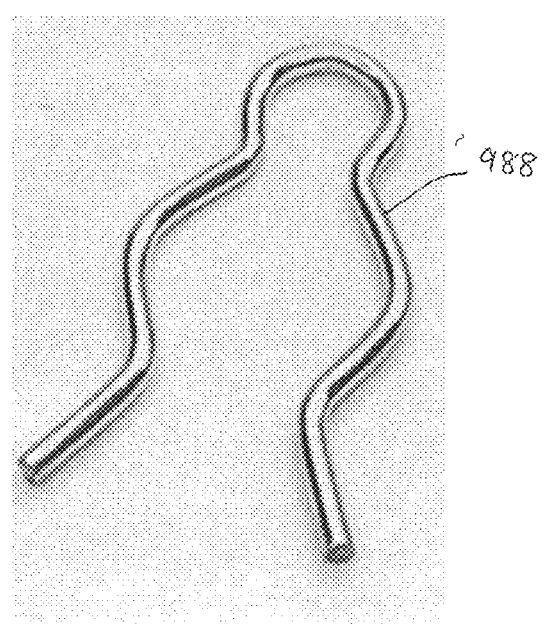

FIGS. 6-9 depict other example resilient members 688, 788, 888, 988 that are configured to flex into and out of the groove 280 (described in greater detail herein below). The type and/or shape of the resilient member 288, 688, 788, 888, 988 can vary. Furthermore, the resilient member 288, 688, 788, 888, 988 can be formed of any suitable material such as plastic or metal. FIG. 6 depicts a resilient member 688 that is generally annular with undulating sides. The resilient members 788, 888, 988 depicted in FIGS. 7-9 are each clips, each having a pair of legs and an open end. In other examples, the resilient member 288, 688, 788, 888, 988 is a spring.

Example operation of the linear actuator 210 is described hereinbelow with respect to FIG. 4. FIG. 4 depicts the rod 216 in a first rod position (e.g., fully retracted rod position). The resilient member 288 is received in the groove 280, and thus, the resilient member 288 prevents inadvertent axial movement of the rod 216 in either the first axial direction (arrow B) or the second axial direction (arrow A). The resilient member 288 is configured to resist radially outward deformation thereof when a relatively small axially directed force or load is applied to the rod 216 (e.g., the weight of the trim tab 40 pulling the rod 216 in the second axial direction (arrow A). For example, the resilient member 288 is configured as a result of material selection, shape, gauge size, etc. to resist radial deformation when a radially directed force below a predetermined threshold is applied thereto.

However, when a relatively large axially directed force or load that is sufficient to flex or resiliently deform the resilient member 288 is applied (i.e., the resulting radially directed force is above the predetermined threshold), the resilient member 288 radially outwardly flexes out of the groove 280 (see example movement arrows C) and the rod 216 is able to axially move in the first axial direction (arrow B) or the second axial direction (arrow A) depending on the direction of the load. The axially directed force or load is applied to the resilient member 288 via the rod 216 having a load acting thereon or via rotation of the spindle 214 that causes the rod 216 to act on and flex the resilient member 288. Specifically, the motor is capable of providing enough torque to the spindle 214 to move the rod 216 such that the resilient member 288 flexes out of the groove 280.

In one specific example, the resilient member 288 is received in the groove 280 as depicted in FIG. 4. The spindle 214 is rotated such that the rod 216 begins to axially move in the second axial direction (see arrow A) and the exterior surface at the proximal rod end 218 applies forces to the resilient member 288. The continued axial movement of the rod 216 causes the resilient member 288 to radially outwardly flex out of the groove 280 (see example arrow C). In certain examples, a lip 282 at the proximal rod end 218 engages the resilient member 288 (e.g., the lip 282 has a surface 284 that engages the resilient member 288) to radially outwardly flex the resilient member 288 as the spindle 214 moves the rod 216 from the first rod position (FIG. 4) in the second axial direction (arrow A) to a second rod position. Note that in certain examples, the housing 212 defines a housing groove 213 that corresponds to and is aligned with the groove 280 defined by the rod 216. In these examples, the resilient member 288 can flex into the housing groove 213. Once the proximal rod end 218 axially moves past the resilient member 288 in the second axial direction (arrow A), the resilient member 288 radially inwardly flexes and assumes its resting (unflexed) state (see example arrow D). The rod 216 no longer contacts or is influenced by the resilient member 288 and freely axially moves as described above to a desired second rod position in which the distal rod end 220 extends or further extends from the housing 212. In some examples, the shape and size of the resilient member 288 and the shape and size of the housing groove 213 are such that the resilient member 288 is held in place with respect to the longitudinal axis L despite no longer residing within the groove 280 in the rod 216. For example, the resilient members 288 depicted in FIGS. 6-9 have irregular shapes such that a portion or portions of the resilient member 288 can reside in the housing groove 213 even when the resilient member 288 is in its unflexed state. Thus, the resilient member 288 is axially fixed relative to the housing 212.

Figure 10:
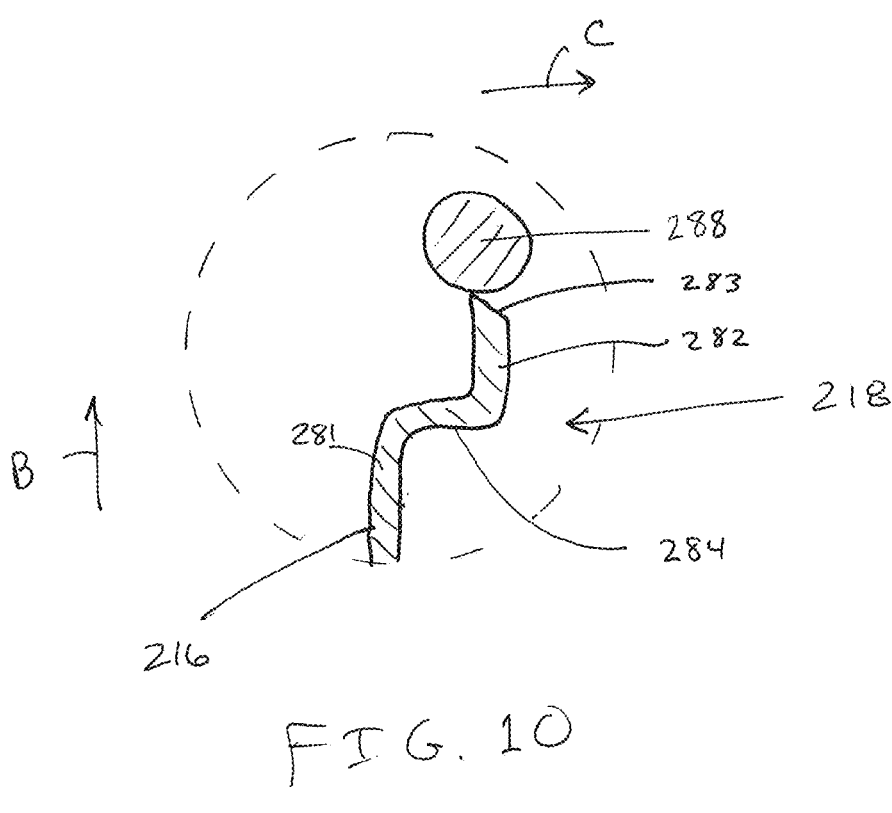
FIG. 10 is a partial cross-sectional view of a proximal rod end of another example rod and a resilient member according to the present disclosure.
Figure 11:
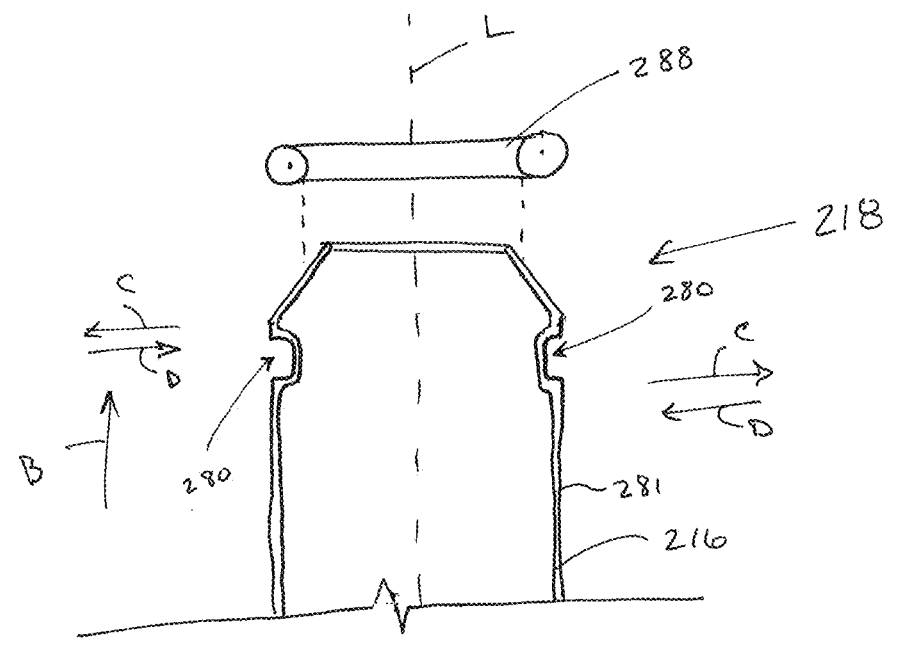
FIG. 11 is a cross-sectional view of a proximal rod end of another example rod and a resilient member according to the present disclosure.

In another example in which the resilient member 288 is not in the groove 280, the spindle 214 rotates to axially move the rod 216 in the first axial direction (arrow B) and a lip 282 at the proximal rod end 218 engages the resilient member 288. The lip 282 radially outwardly flexes the resilient member 288 (see example arrows C) as the rod 216 continues to move in the first axial direction (arrow B). Once the lip 282 axially passes the resilient member 288, the resilient member 288 radially inwardly flexes into the groove 280 as it attempts to regain its resting state. As such, the resilient member 288 reengages the rod 216 and prevents further axial movement of the rod 216 in either axial direction A or B along the longitudinal axis L unless and until a load over a given threshold is applied. In certain examples, the lip 282 includes a radially outwardly sloping surface 283 that wedges the resilient member 288 radially outwardly (arrows C) as the rod 216 moves in the first axial direction (arrow B). Note that the cross-section of the sloping surface 283 is schematically depicted superimposed on the rod 216 depicted in FIG. 4, which has a non-sloping surface at the upper end of the lip 282. FIG. 10 depicts a portion of the proximal rod end 218 and the lip 282 of another example rod 216. In this example, the rod 216 is adjacent to the resilient member 288. As the rod 216 is moved in the first axial direction (arrow B), the radially outwardly sloping surface 283 of the lip 282 engages the resilient member 288 and wedges the resilient member 288 radially outwardly (arrow C). In other examples, the proximal rod end 218 is radially inwardly tapered in the first axial direction (arrow B) such that as the rod 216 is moved in the first axial direction (arrow B), the sidewall 281 of the rod 216 radially outwardly flexes the resilient member 288. FIG. 11 depicts a cross-section of another example rod 216 with the proximal rod end 218 being tapered radially inwardly in the first axial direction (arrow B). In this example, the proximal rod end 218 is spaced apart from the resilient member 288 (e.g., the rod 216 is in a second rod position). As the rod 216 is moved in the first axial direction (arrow B) the tapered proximal rod end 218 engages and wedges the resilient member 288 radially outwardly (arrow C). Further axial movement of the rod 216 in the first axial direction (arrow B) causes the proximal rod end 218 to slide along the resilient member 288 until the resilient member 288 automatically flexes into the groove 280 (see arrow D) when the resilient member 288 aligns with the groove 280.

In the example shown herein, the rod 216 comprises a groove 280 at the proximal rod end 218. However, in other examples, the groove 280 could be provided in the outer surface of the rod 216 closer to the middle of the rod 216 or closer to the distal rod end 220. The housing groove 213 would correspondingly be located adjacent the groove 280 in the rod 216 when the rod 216 was in the first rod position (i.e., fully retracted). In still other examples, the groove 280 may be provided at the proximal rod end 218, but the housing groove 213 is provided at a location such that the first rod position is one other than that in which the rod 216 is fully retracted into the housing 212, such as for example a three-quarter retracted position. In still other examples, two or more pairs of resilient members 288 and corresponding grooves 280, 213 are provided in a single housing 212.

Figure 12:
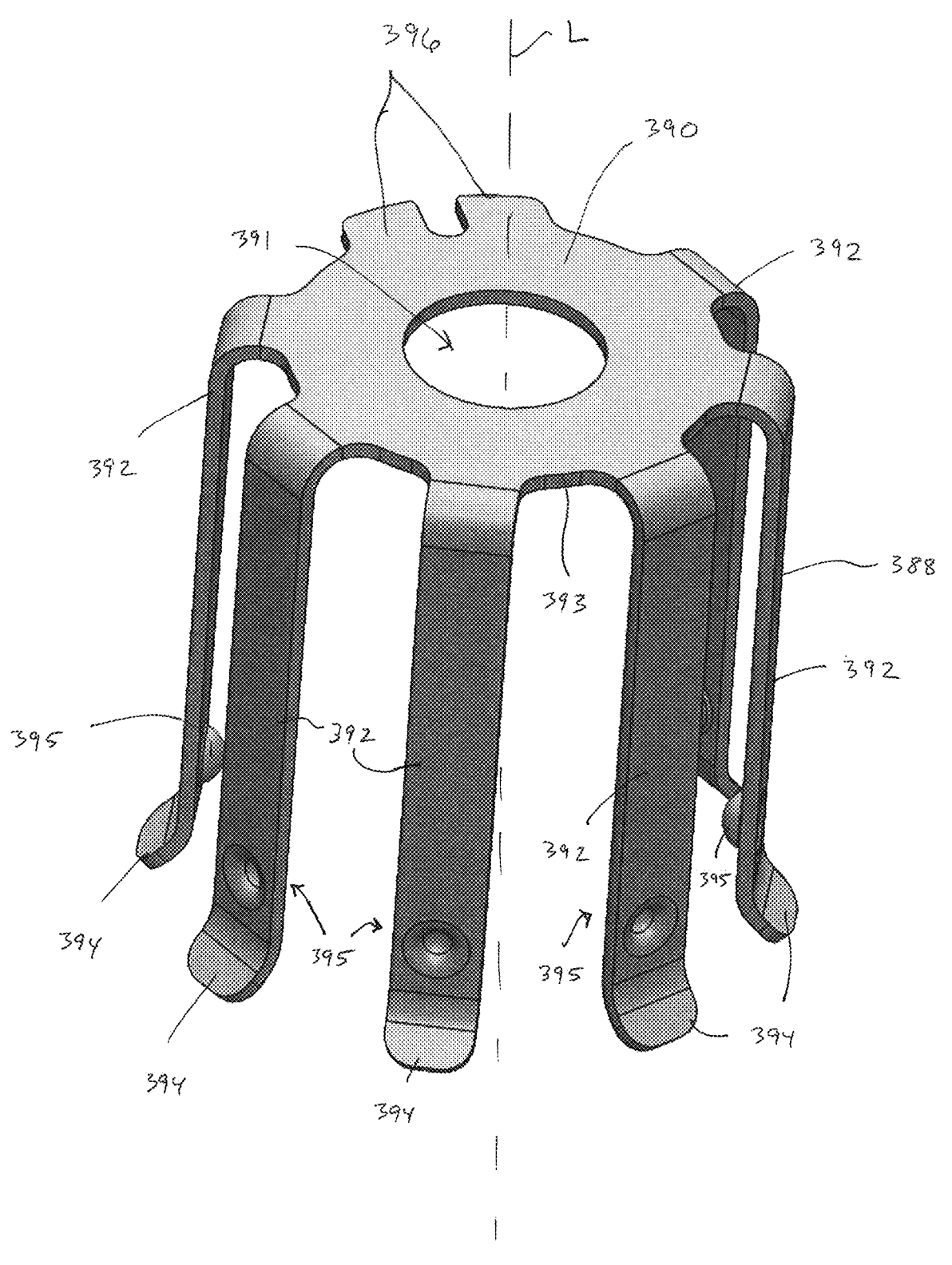
FIG. 12 is a perspective view of another example resilient member according to the present disclosure.
Figure 13:
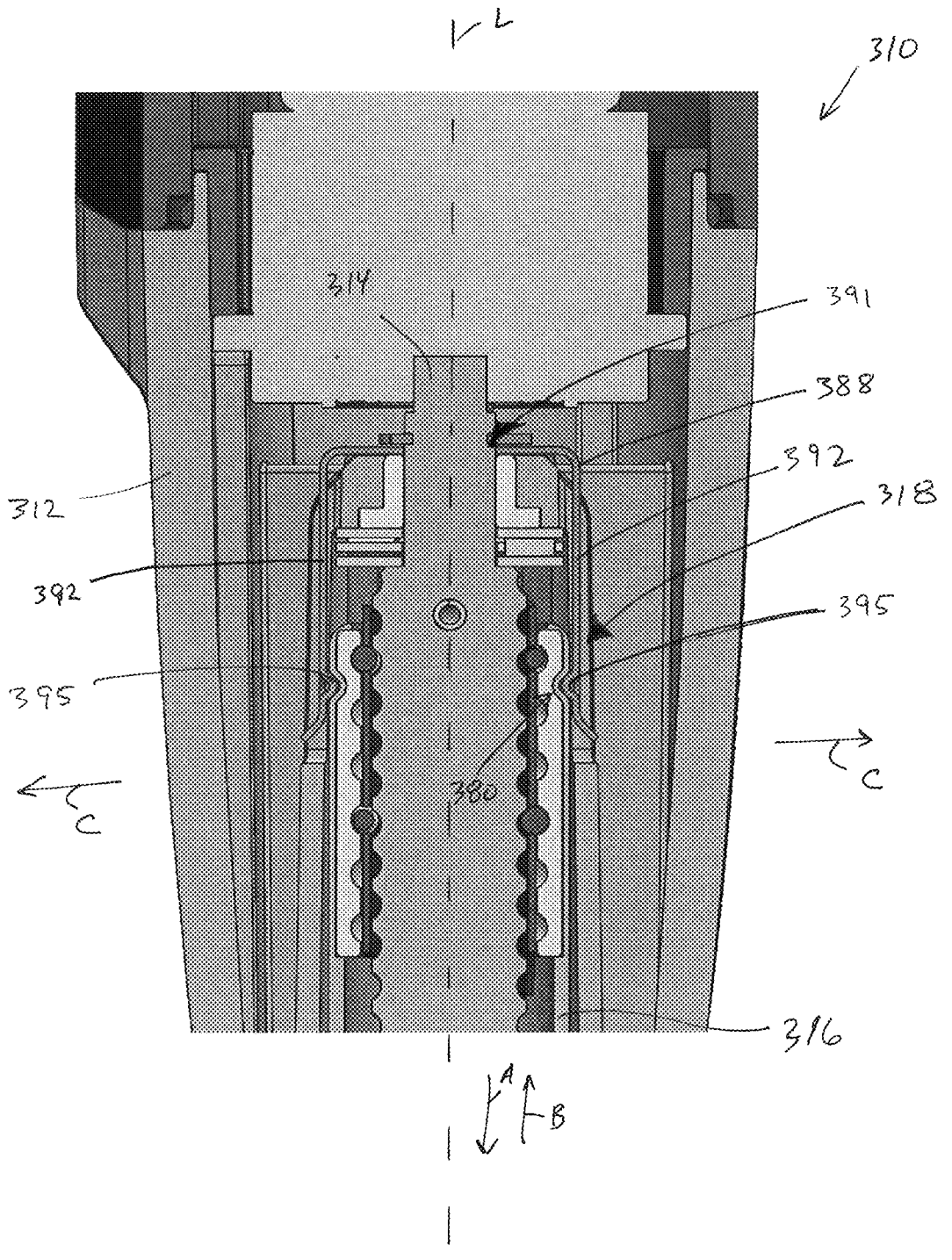
FIG. 13 is a partial cross-sectional view of another example linear actuator according to the present disclosure.
Figure 15:
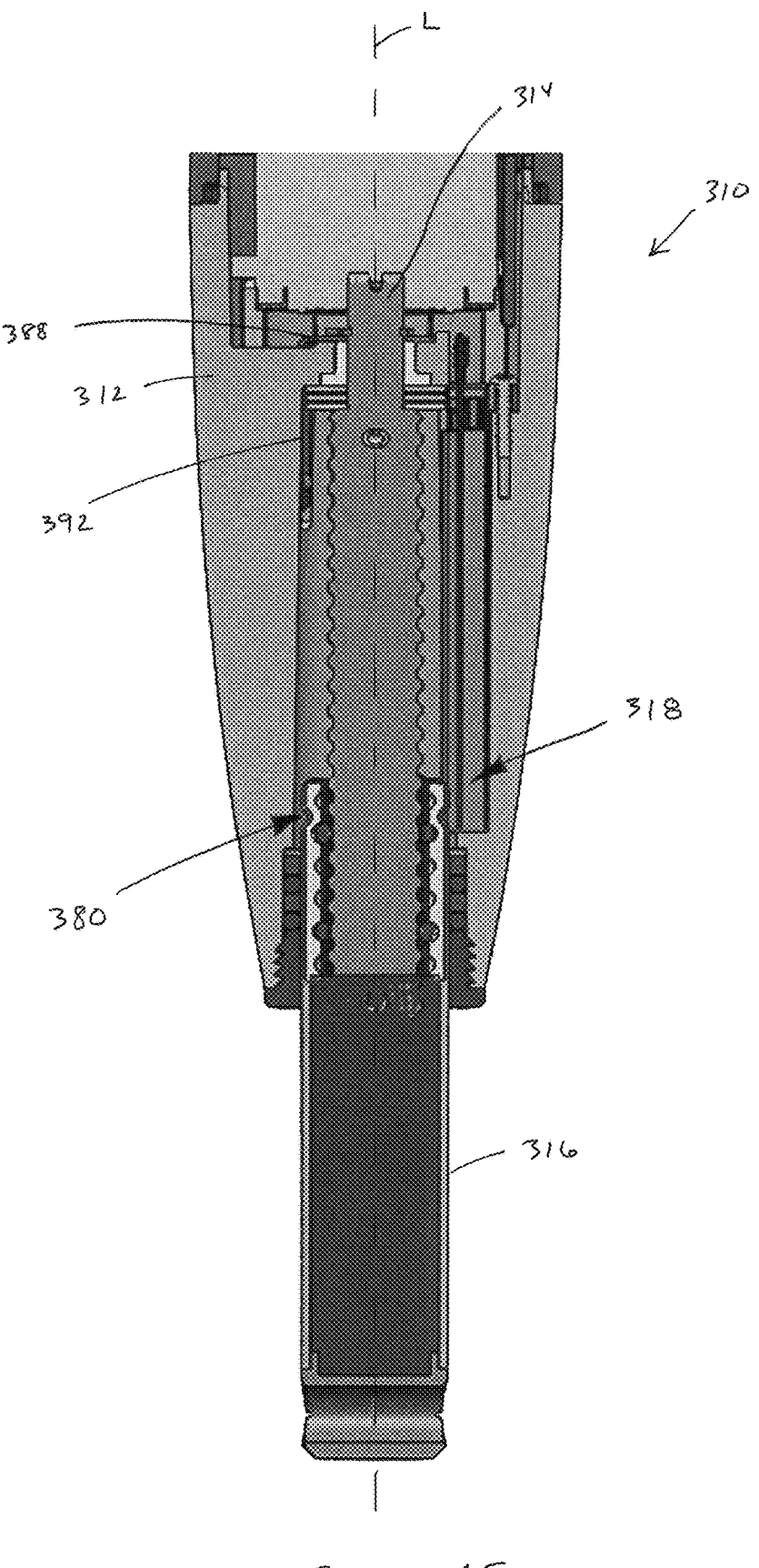
FIG. 15 is another cross-sectional view of the linear actuator of FIG. 13.

In other examples, the resilient member 388 (see FIG. 12) is a spring clip having a center body 390 with a center opening 391 and a plurality of legs 392 extending axially from an outer perimeter 393 of the center body 390. In this example, each leg in the plurality of legs 392 has a radially outwardly extending lip 394 and a radially inwardly extending protrusion 395 (here, shaped like a dimple, although other shapes could be used). FIG. 13 depicts the example resilient member 388 of FIG. 12 coupled to another example linear actuator 310 with housing 312 according to the present disclosure. In this example, the spindle 314 is received into the center opening 391 of the resilient member 388 and the legs 392 axially extend along the spindle 314. In the configuration shown here, the protrusions 395 are received into the groove 380 provided in the rod 316. Specifically, one or more protrusions 395 are received in the groove 380, and thus, the resilient member 388 prevents inadvertent axial movement of the rod 316 in either the first axial direction (arrow B) or the second axial direction (arrow A). From a starting position in which the rod 316 is extended from the housing 312 and the protrusions 395 are not in the groove 380 (see FIG. 15, which shows the rod 316 in the second rod position), the spindle 314 rotates to axially move the rod 316 in the first axial direction (arrow B) and the proximal rod end 318 engages the resilient member 388. The proximal rod end 318 engages the lips 394 and radially outwardly flexes the legs 392 of the resilient member 388 (see example arrows C) as the rod 316 continues to move in the first axial direction (arrow B). The legs 392 radially outwardly flex until the protrusions 395 are aligned with and thereafter received into the groove 380 as the resilient member 388 attempts to regain its resting state. Once the protrusions 395 are received into the groove 380, the resilient member 388 reengages the rod 316 in a manner that prevents inadvertent axial movement of the rod 316 in either axial direction A or B along the longitudinal axis L. In certain examples, the resilient member 388 includes retaining arms 396 which couple to the spindle 314 and prevent inadvertent axial movement of the resilient member 388.

Figure 14:
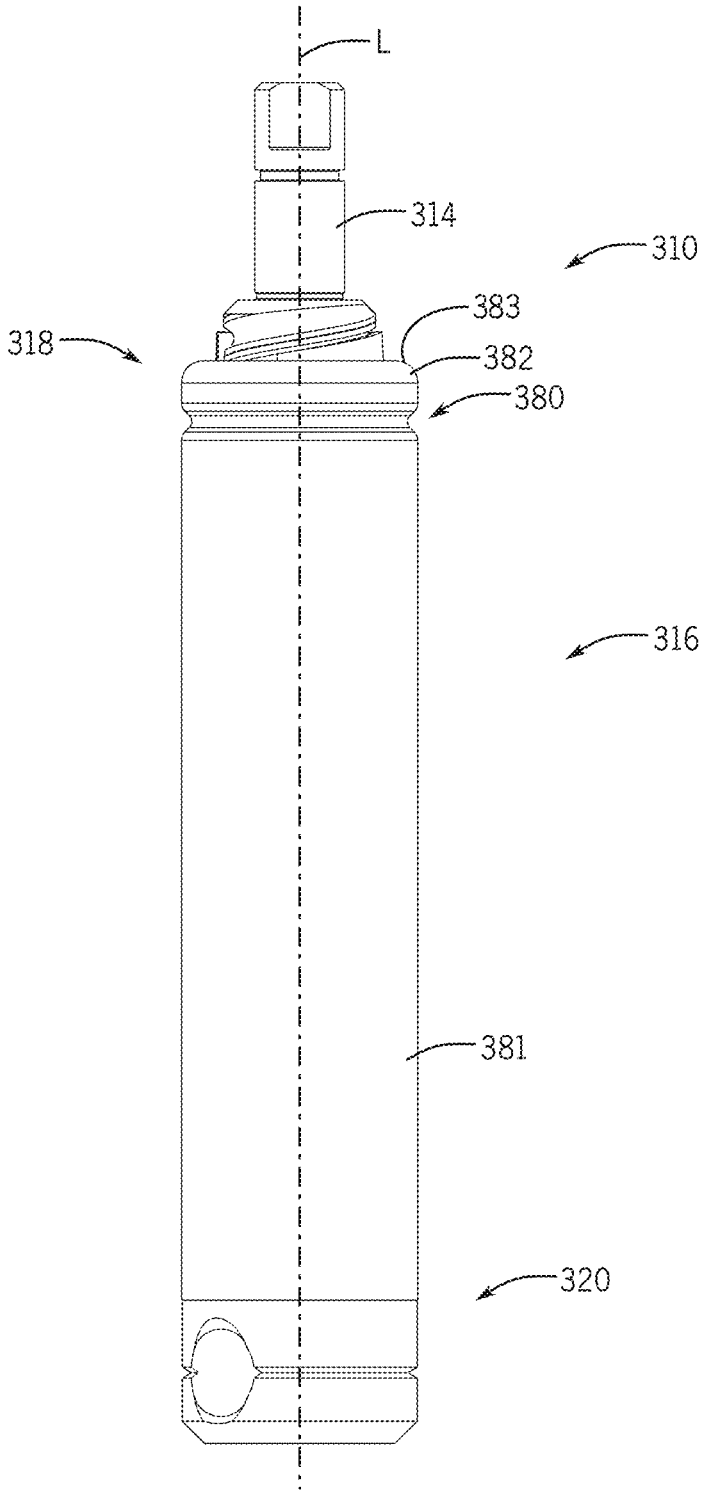
FIG. 14 is a perspective view of another example rod according to the present disclosure.

FIG. 14 shows the rod 316 situated about the spindle 314 of the assembly shown in FIG. 13. The rod 316 extends along the longitudinal axis L, and the rod 316 has a sidewall 381. The sidewall 381 generally forms a cylindrical shape with a radially inwardly pinched section where the groove 380 is located. The groove 380 is at the proximal rod end 318, which is opposite the distal rod end 320. The shape of the groove 380 can vary, and in the example depicted in FIG. 14 the groove is an annular groove 380. Although the rod 316 is used in the example assembly shown in FIG. 13, the rod 316 could replace the rod 216 in the example assembly shown in FIG. 4. Similarly, although the resilient member 388 is used in the example assembly shown in FIG. 13, the resilient member 388 could replace the resilient member 288 in the example assembly shown in FIG. 4.

In certain examples, the rod 316 depicted in FIG. 14 can further comprise a lip 382 at its proximal rod end 318 similar to the lip 282 of the rod 216 depicted in FIG. 4. The lip 382 is configured to radially outwardly flex the legs 392 of the resilient member 388 depicted in FIG. 14 as the spindle 314 moves the rod 316 in the first axial direction (arrow B) toward the first rod position in which the protrusions 395 of the resilient member 388 are received in the groove 380. In certain examples, the lip 382 of the rod 316 flexes the legs 392 of the resilient member 388 radially outwardly as the spindle 314 moves the rod 316 from the first rod position in a second axial direction (arrow A) opposite the first axial direction (arrow B). Note further that in other examples, the above-noted lip 382 at the proximal rod end 318 can include a radially outwardly sloping surface 383 similar to the sloping surface 283 depicted in FIG. 4 that wedges the legs 392 of the resilient member 388 radially outwardly as the spindle 314 moves the rod 316 in the first axial direction (arrow B).

According to one example of the present disclosure, an electric linear actuator 10, 110, 210, 310 comprises a housing 12, 112, 212, 312 extending along an axis L, a spindle 14, 114, 214, 314 in the housing 12, 112, 212, 312 and extending along the axis L, a motor 22, 122 coupled to and configured to rotate the spindle 14, 114, 214, 314 and a rod 16, 116, 216, 316 coaxially coupled to the spindle 14, 114, 214, 314 and axially movable with respect to the housing 12, 112, 212, 312 in response to rotation of the spindle 14, 114, 214, 314 the rod 16, 116, 216, 316 comprising a groove 280, 380. A resilient member 288, 388, 688, 788, 888, 988 is configured to be received in the groove 280, 380 to prevent back-drive of the motor 22, 122 when the rod 16, 116, 216, 316 is subject to a load.

According to one example of the present disclosure, an electric linear actuator 10, 110, 210, 310 comprises a housing 12, 112, 212, 312 extending along an axis L, a spindle 14, 114, 214, 314 in the housing 12, 112, 212, 312 and extending along the axis L, a motor 22, 122 coupled to and configured to rotate the spindle 14, 114, 214, 314 and a rod 16, 116, 216, 316 coaxially coupled to the spindle 14, 114, 214, 314 and axially movable with respect to the housing 12, 112, 212, 312 in response to rotation of the spindle 14, 114, 214, 314 the rod 16, 116, 216, 316. The rod 16, 116, 216, 316 comprises a groove 280, 380. A resilient member 288, 388, 688, 788, 888, 988 is configured to be received in the groove 280, 380 to prevent retraction or extension of the rod 16, 116, 216, 316 when it is subjected to a load.

According to some aspects, the spindle 14, 114, 214, 314 moves the rod 16, 116, 216, 316 in a first axial direction such that the rod 16, 116, 216, 316 radially outwardly flexes the resilient member 288, 388, 688, 788, 888, 988.

According to some aspects, the groove 280, 380 is an annular groove.

According to some aspects, the resilient member 288, 388, 688, 788, 888, 988 is axially fixed relative to the housing 12, 112, 212, 312.

According to some aspects, the spindle 14, 114, 214, 314 axially moves the rod 16, 116, 216, 316 in a first axial direction toward a first rod position and the rod 16, 116, 216, 316 radially outwardly flexes the resilient member 288, 388, 688, 788, 888, 988. The resilient member 288, 388, 688, 788, 888, 988 is received in the groove 280, 380 when the rod 16, 116, 216, 316 is in the first rod position.

According to some aspects, the first rod position is a fully retracted position of the rod 16, 116, 216, 316.

According to some aspects, as the spindle 14, 114, 214, 314 moves the rod 16, 116, 216, 316 from the first rod position in a second axial direction toward a second rod position, the rod 16, 116, 216, 316 radially outwardly flexes the resilient member 288, 388, 688, 788, 888, 988 out of the groove 280, 380.

According to some aspects, the rod 16, 116, 216, 316 further comprises a lip 282, 382 that radially outwardly flexes the resilient member 288, 388 as the spindle 14, 114, 214, 314 moves the rod 16, 116, 216, 316 in a first axial direction toward a first rod position in which the resilient member 288, 388, 688, 788, 888, 988 is received in the groove 280, 380.

According to some aspects, the lip 282, 382 has a radially outwardly sloping surface 283, 383 that wedges the resilient member 288, 388, 688, 788, 888, 988 radially outwardly as the spindle 14, 114, 214, 314 moves the rod 16, 116, 216, 316 in the first axial direction.

According to some aspects, the lip 282, 382 flexes the resilient member 288, 388, 688, 788, 888, 988 radially outwardly as the spindle 14, 114, 214, 314 moves the rod 16, 116, 216, 316 from the first rod position in a second axial direction opposite the first axial direction.

According to some aspects, the rod 16, 116, 216, 316 has a proximal rod end 18, 118, 218, 318 adjacent to the motor 22, 122 and an opposite, distal rod end 20, 120, 320 and the groove 280, 380 is at the proximal rod end 18, 118, 218, 318.

According to one example of the present disclosure, a linear actuator 10, 110, 210, 310 comprises a housing 12, 112, 212, 312 extending along an axis L, a rod 16, 116, 216, 316 axially movable so as to extend and retract with respect to the housing 12, 112, 212, 312 the rod 16, 116, 216, 316 comprising a groove 280, 380 and a resilient member 288, 388, 688, 788, 888, 988 configured to be received in the groove 280, 380 to prevent inadvertent extension of the rod 16, 116, 216, 316 from the housing 12, 112, 212, 312 when the rod 16, 116, 216, 316 is subject to a load.

According to some aspects, a spindle 14, 114, 214, 314 is coaxially coupled to the rod 16, 116, 216, 316 and an electric motor is 22, 122 configured to rotate the spindle 14, 114, 214, 314 to axially move the rod 16, 116, 216, 316.

According to some aspects, the rod 16, 116, 216, 316 has a proximal rod end 18, 118, 218, 318 adjacent to the motor 22, 122 and an opposite, distal rod end 20, 120 and the groove 280, 380 is at the proximal rod end 18, 118, 218, 318.

According to some aspects, the rod 16, 116, 216, 316 moves in a first axial direction such that the rod 16, 116, 216, 316 radially outwardly flexes the resilient member 288, 388, 688, 788, 888, 988.

According to some aspects, the groove 280, 380 is an annular groove.

According to some aspects, the resilient member 288, 388, 688, 788, 888, 988 is axially fixed relative to the housing 12, 112, 212, 312.

According to some aspects, the resilient member 288, 388, 688, 788, 888, 988 is received in the groove 280, 380 when the rod 16, 116, 216, 316 is in a first rod position and as the rod 16, 116, 216, 316 is moved from the first rod position in a second axial direction toward a second rod position, the rod 16, 116, 216, 316 radially outwardly flexes the resilient member 288, 388, 688, 788, 888, 988 out of the groove 280, 380.

According to some aspects, the rod 16, 116, 216, 316 further comprises a lip 282, 382 that radially outwardly flexes the resilient member 288, 388 as the rod 16, 116, 216, 316 moves in a first axial direction toward a first rod position in which the resilient member 288, 388 is received in the groove 280, 380.

According to some aspects, the lip 282, 382 has a radially outwardly sloping surface 283, 383 that wedges the resilient member 288, 388 radially outwardly as the rod 16, 116, 216, 316 moves in the first axial direction.

According to some aspects, the lip 282, 382 flexes the resilient member 288, 388, 688, 788, 888, 988 radially outwardly out of the groove 280, 380 as the rod 16, 116, 216, 316 moves from the first rod position in a second axial direction opposite the first axial direction.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric linear actuator comprising:
a housing extending along an axis;
a spindle in the housing and extending along the axis;
a motor coupled to and configured to rotate the spindle;
a rod coaxially coupled to the spindle and axially movable with respect to the housing in response to rotation of the spindle, the rod comprising a groove; and
a resilient member configured to be received in the groove to prevent back-drive of the motor when the rod is subject to a load,
wherein the resilient member is axially fixed relative to the housing.

2. The electric linear actuator according to claim 1, wherein the rod has a proximal rod end adjacent to the motor and an opposite, distal rod end; and
wherein the groove is at the proximal rod end.

3. The electric linear actuator according to claim 1, wherein the spindle moves the rod in a first axial direction such that the rod radially outwardly flexes the resilient member.

4. The electric linear actuator according to claim 1, wherein the groove is an annular groove.

5. The linear actuator according to claim 1, wherein the resilient member is configured to prevent inadvertent extension of the rod from the housing when the load is below a predetermined threshold; and
wherein the resilient member is configured to outwardly flex out of the groove when the rod is subject to a second load exceeding the predetermined threshold as the rod is extended from the housing using the motor.

6. The electric linear actuator according to claim 1, wherein as the spindle axially moves the rod in a first axial direction toward a first rod position, the rod radially outwardly flexes the resilient member; and
wherein the resilient member is received in the groove when the rod is in the first rod position.

7. The electric linear actuator according to claim 6, wherein the first rod position is a fully retracted position of the rod.

8. The electric linear actuator according to claim 6, wherein as the spindle moves the rod from the first rod position in a second axial direction toward a second rod position, the rod radially outwardly flexes the resilient member out of the groove.

9. The electric linear actuator according to claim 1, wherein the rod further comprises a lip that radially outwardly flexes the resilient member as the spindle moves the rod in a first axial direction toward a first rod position in which the resilient member is received in the groove.

10. The electric linear actuator according to claim 9, wherein the lip has a radially outwardly sloping surface that wedges the resilient member radially outwardly as the spindle moves the rod in the first axial direction.

11. The electric linear actuator according to claim 9, wherein the lip flexes the resilient member radially outwardly as the spindle moves the rod from the first rod position in a second axial direction opposite the first axial direction.

12. A linear actuator comprising:
a housing extending along an axis;
a resilient member; and
a rod axially movable so as to extend and retract with respect to the housing, the rod comprising a groove,
wherein the rod further comprises a lip that radially outwardly flexes the resilient member as the rod moves in a first axial direction toward a first rod position in which the resilient member is received in the groove,
wherein the lip has a radially outwardly sloping surface that wedges the resilient member radially outwardly as the rod moves in the first axial direction,
wherein the resilient member is configured to be received in the groove when the rod is in a first rod position and is configured to prevent inadvertent extension of the rod from the housing when the rod is subject to a load below a predetermined threshold, and
wherein the resilient member is configured to outwardly flex out of the groove when the rod is subject to a second load exceeding the predetermined threshold as the rod is moved from the first rod position in a second axial direction toward a second rod position.

13. The linear actuator according to claim 12, wherein the lip flexes the resilient member radially outwardly out of the groove as the rod moves from the first rod position in the second axial direction opposite the first axial direction.

14. The linear actuator according to claim 12, wherein the rod moves in the first axial direction such that the rod radially outwardly flexes the resilient member.

15. The linear actuator according to claim 12, wherein the resilient member is axially fixed relative to the housing.

16. The linear actuator according to claim 12, further comprising a spindle coaxially coupled to the rod and an electric motor configured to rotate the spindle to axially move the rod, wherein the resilient member is configured to prevent backdrive of the motor when the rod is subject to the load while the motor is not powered on.

17. The linear actuator according to claim 16, wherein the rod has a proximal rod end adjacent to the electric motor and an opposite, distal rod end; and
wherein the groove is at the proximal rod end.

18. A linear actuator comprising:
a housing extending along an axis;
a rod axially movable so as to extend and retract with respect to the housing, the rod comprising a groove; and
a resilient member configured to be received in the groove to prevent inadvertent extension of the rod from the housing when the rod is subject to a load,
wherein the resilient member is axially fixed relative to the housing.

19. The linear actuator according to claim 18, further comprising a spindle coaxially coupled to the rod and an electric motor configured to rotate the spindle to axially move the rod.

20. The linear actuator according to claim 19, wherein the rod has a proximal rod end adjacent to the electric motor and an opposite, distal rod end; and wherein the groove is at the proximal rod end.

\* \* \* \* \*